United States Patent [19]

Wirth

[11] 3,754,421

[45] Aug. 28, 1973

[54] LOCKING COUPLING MECHANISM FOR REEL STORAGE CONTAINER

[75] Inventor: Wayne M. Wirth, Saint Paul, Minn.

[73] Assignee: Minnesota Mining and Manufacturing Company, St. Paul, Minn.

[22] Filed: Nov. 1, 1971

[21] Appl. No.: 194,248

[52] U.S. Cl. .......... 70/63, 206/52 F
[51] Int. Cl. .......... E05b 65/52
[58] Field of Search .......... 70/63, 163, 164, 70/166, 167, 168, 169; 206/52 F, 59 E; 220/39 C, 55 L; 312/20

[56] References Cited

UNITED STATES PATENTS

| | | | |
|---|---|---|---|
| 2,009,808 | 7/1935 | Lazarides | 70/170 |
| 3,138,250 | 6/1964 | Burgess | 206/52 F |
| 3,498,447 | 3/1970 | Edwards | 206/52 F |
| 3,582,169 | 6/1971 | Koenig | 312/20 |

FOREIGN PATENTS OR APPLICATIONS

| | | | |
|---|---|---|---|
| 1,191,623 | 5/1970 | Great Britain | 70/164 |

*Primary Examiner*—Robert L. Wolfe
*Attorney*—Alexander, Sell, Steldt & Delahunt

[57] ABSTRACT

A mechanism for releasably coupling the portions of a reel storage container, including a key-operated cylinder lock for locking the mechanism in the coupled position.

9 Claims, 6 Drawing Figures

Patented Aug. 28, 1973 3,754,421

2 Sheets-Sheet 1

INVENTOR
WAYNE M. WIRTH
BY Kinney, Alexander, Sell, Steldt & De La Hunt
ATTORNEYS INVENTOR
WAYNE M. WIRTH
BY Kinney, Alexander,
Sell, Steldt & De La Hunt
ATTORNEYS

LOCKING COUPLING MECHANISM FOR REEL STORAGE CONTAINER

BACKGROUND OF THE INVENTION

This invention relates to an improvement in the mechanism for releasably closing a reel storage container.

Reels wound with tape such as prerecorded video tape are often transported between subsequent users in storage containers. Special mechanisms for closing the storage containers have been developed to avoid accidental opening of the containers during shipment, including a mechanism having an independently operable latch to maintain the mechanism in a closed position, such as that described herein. Experience has shown, however, that video tape containers are subject to unauthorized opening during shipment, which has led to damage to the tapes enclosed therein.

Thus, there is a need for a mechanism, including an inexpensive lock for releasably closing a reel storage container which restricts unauthorized access to the storage container. Restricted access to certain video tape storage containers may also be desirable in recording or braodcasting facilities to prevent inadvertent and unauthorized usage of a particular video recording, or to aid in the identification of particular video recording.

SUMMARY OF THE INVENTION

A video recording tape storage container according to the present invention affords key-operated locking of the storage container to restrict access of unauthorized individuals to a video recording contained therein.

According to the present invention there is provided a mechanism for releasably coupling a first and a second portion of a reel storage container. The mechanism comprises a manually engageable movable member including a follower mounted on and being the second portion for movement relative thereto between an open and a latched position. The mechanism also includes a member defining a ramped surface mounted on the first portion of the storage container to be out of engagement with the follower when the rotatable member is in the open position to afford positioning of the first and second portion of the storage container in closed relationship. The member is positioned to cause engagement between the follower and the ramped surface to draw the portions into sealed engagement when the rotatable member is moved to the latched position. The mechanism includes a key-operated pin tumbler lock mechanism mounted on the second portion having a plug mounted for rotation between a locked and an unlocked position an an arm attached to the plug and rotatable therewith when said plug is moved to the locked position and the rotatable member is in the latched position to engage the follower to block movement thereof toward the open position.

BRIEF DESCRIPTION OF THE PREFERRED EMBODIMENT

The invention will be further described with reference to the accompanying drawing wherein like members refer to like parts in the several views, and wherein.

DESCRIPTION OF THE PREFERRED EMBODIMENT

Figure 1:
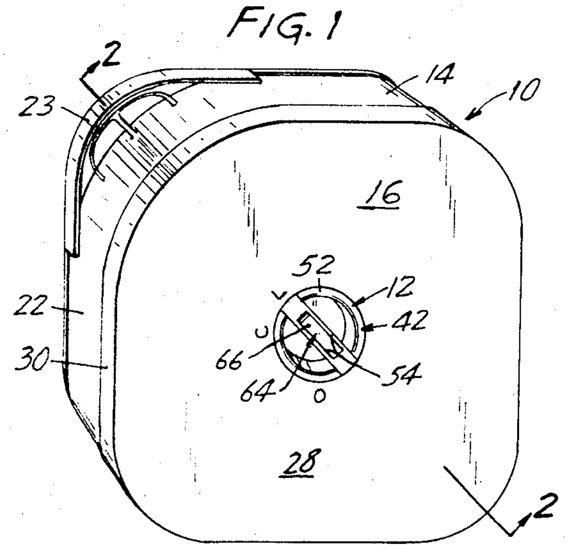
FIG. 1 is a perspective view of a reel storage container having a mechanism for releasably coupling the portions of the container according to the present invention.
Figure 3:
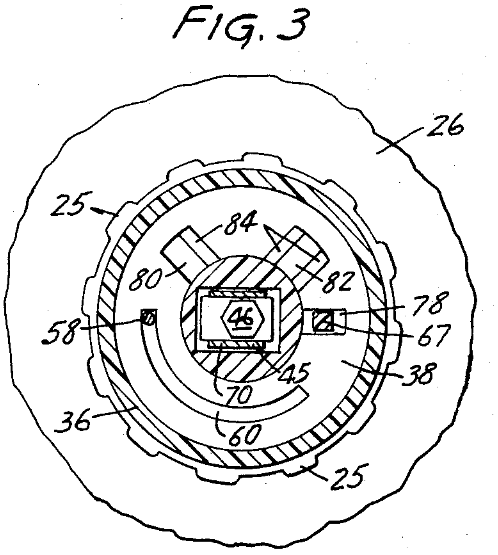
FIG. 3 is a fragmentary sectional view taken approximately along lines 3—3 of FIG. 2.
Figure 2:
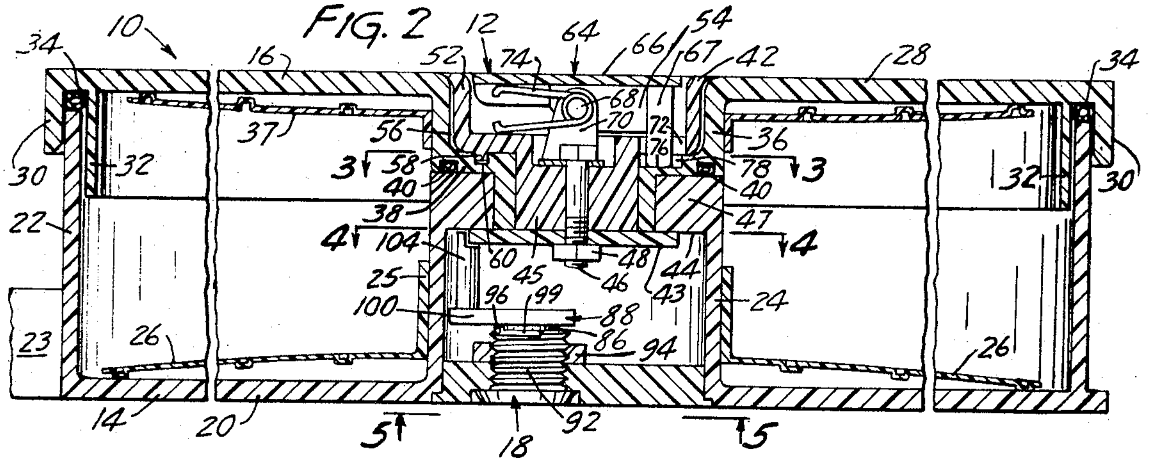
FIG. 2 is an enlarged fragmentary view partially in section taken approximately along lines 2—2 of FIG. 1.

Referring now to FIGS. 1 and 2, there is shown a reel storage container 10 having a mechanism 12 according to the present invention for releasably coupling together a first portion 14 and a second portion 16 of the storage container 10, including a key-operated cylinder lock 18, for locking the mechanism 12 in the latched position.

As illustrated, the firt portion 14 of the container 10 includes a planar side wall 20 having formed about its edges a projecting edge wall 22, and having a carrying handle 23 formed around one corner. A projecting hub 24 is formed in a generally central location on the side wall 20, and the periphery thereof serves to rotatably journal the core 25 of a protective flange 26, the core 25 being sized to be pressed into the central opening in a reel (not shown) to be stored within the container 10. The hub 24 also includes a portion of the mechanism 12, as will later be explained, for coupling the first and second portions 14 and 16 of the storage container 10, including the cylinder lock 18.

The second portion 16 of the storage container 10 comprises a side wall 28 having a pair of short projecting edge walls 30 and 32. The edge walls 30 and 32 are spaced and formed to afford engagement of the end of the wall 22 against a circular O-ring gasket 34 supported at their juncture to afford a seal between the second portion 16 and the wall 22. The side wall 28 is also formed with a projecting centrally located hub 36 having rotatably mounted about its periphery a protective flange having a central collar 37 sized to be pressed into the central opening in a reel on the side opposite that engaged by the core 25. An end wall 38 of the hub 36 is formed with an annular groove mounting a circular O-ring 40 for engagement between the hub 36 and the distal end of the hub 24 when the first and second portions 14 and 16 of the container 10 are in closed position to afford, together with the gasket 34, a dust-tight seal for the container 10 to protect a video tape reel mounted therein.

Referring now to FIGS. 2, 3, 4, 5, and 6 the mechanism 12 for releasably coupling the portions 14 and 16 of the storage container 10 is shown mounted within the hubs 24 and 36. The mechanism 12 includes a movable or rotatable member 42 mounted for rotation in the hub 36 which member 42 is manually movable relative thereto between an open and a latched position to open or close the mechanism by moving a follower 43 mounted on the rotatable member 42 in or out of engagement with an axially ramped surface 44 formed on an arcuate end member 47 of the hub 24. The rotatable member 42 includes a cylindrical stem 45 attached by a bolt 46 and nut 48 to the bar-like follower 43 extending diametrically of the axis of the member 42 to form two radial arms. A dished flanged 52 is formed at the end of the rotatable member 42 opposite the follower 43. The flange 52 is traversed by a pair of ribs 54 housing a portion of the latch means later to be described, and defining a handle which is manually engageable to afford rotation of the rotatable member 42. The open and latched position of the rotatable member 42 are defined by the limited movement of a pin 58 carried on the outer surface of the flange 52 in an arcuate groove 60 formed in the wall 38 of the hub 36 adjacent the flange 52.

The arcuate end member 47 defining the ramped surface 44 is formed with two opposed notches 62 corresponding to the position of the follower 43 in the open position of the rotatable member 42 (shown in FIG. 6) to afford inserting the follower 43 axially into the hub 24 upon mating of the first and second portions 14 and 16. Subsequent rotation of the rotatable member 42 toward its latched position (FIGS. 1, 2, 3 and 4) affords engagement of the follower 43 with the ramped surface 44. The ramped surface 44 is formed to draw the portions 14 and 16 into sealed engagement about the O-ring seals 34 and 40 when the follower 43 is moved by the rotatable member 42 toward the latched position, the sealed engagement being achieved subsequent to the first 90° portion of such rotation at an intermediate closed position and being maintained until the rotatable member 42 is moved about an additional 45 degrees to the latched position.

The mechanism 12 for releasably coupling the portions 14 and 16 of the storage container 10 further includes detent means including catch means for providing manually releasable latching engagement between the rotatable member 42 and the second portion 16 at the latched position of the rotatable member 42, and to maintain the rotatable member 42 in its open, or in its intermediate closed position, until a predetermined rotational force is applied thereto moving it from its intermediate closed position, or from its open position towards its latched position.

The catch means includes a catch member 64 having a planar surface 66, a depending bar-like catch element 67, and a pair of gudgeons 68 for pivotally mounting the catch member 64 on a U-shaped mounting bracket 70. The U-shaped bracket 70 is mounted by the bolt 46 in the opening between the ribs 54 so that the surface 66 may be positioned even with the edges of the ribs 54, and the catch element 67 is positioned in an orifice 72 through the flange 52. The catch member 64 is pivotable between an engaged position to which it is biased by a biasing means or spring 74 and at which the surface 66 is even with the edges of the ribs 54 and an end 76 of the catch element 67 projects through the opening 72 in the flange 52; and a release position at which the surface 66 is tilted about the gudgeons 68 with respect to the edge of the ribs 54, and the end of the catch element 67 is positioned with the flange 52.

An opening defining a keeper 78 is formed in the wall 38 of the second portion 16 and will accept the end 76 of the catch element 67 under the bias of the spring 74 when the rotatable member 42 is in its latched position. Movement of the rotatable member 42 from its latched position requires manual engagement of the surface 66 to rotate the catch member 64 to the release position and remove he catch element 67 from the keeper 78.

The detent means includes grooves 80 and 82 formed in the wall 38 and positioned to be engageable by the end 76 of the catch element 67 when the rotatable member 42 is in the open position, or in the intermediate closed position respectively. The grooves 80 and 82 are formed with inclined walls 84 which, upon a predetermined rotational force being applied to the rotatable member 42, will provide a camming action against the end 76 of the catch element 67. This camming action moves the catch member 64 to the release position against the bias of the spring 74 where it will be maintained by contact between the end 76 and the wall 38 until a groove 80 or 82 or the keeper 78 is engaged.

Figure 4:
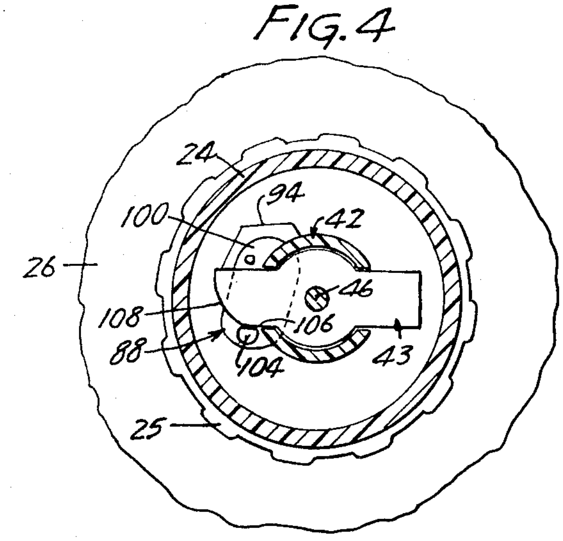
FIG. 4 is a fragmentary sectional view taken approximately along lines 4—4 of FIG. 2.
Figure 5:
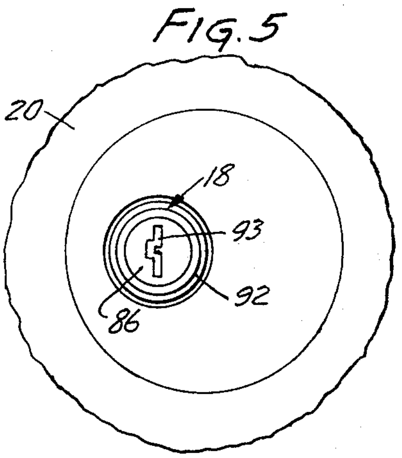
FIG. 5 is a fragmentary view taken approximately along lines 5—5 of FIG. 2.
Figure 6:
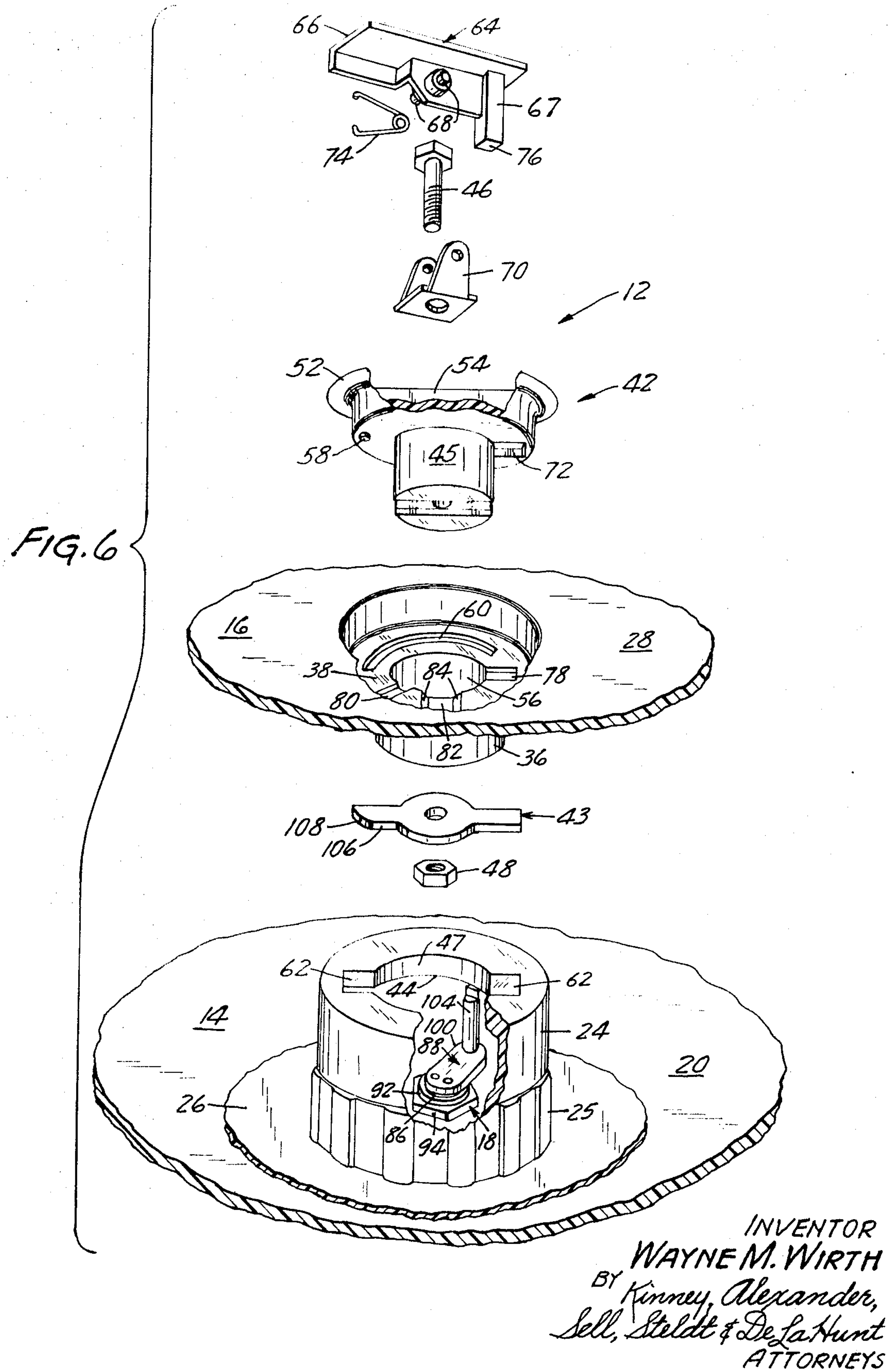
FIG. 6 is an exploded perspective view partially in section of the mechanism for releasably coupling the portions of the reel storage container according to the present invention.

The mechanism for releasably coupling the portions 14 and 16 of the storage container 10 also includes a lock means comprising the key-operated pin tumbler cylinder lock 18. The cylinder lock 18 includes a key-operated plug 86 rotatably mounted on the second portion 16 for rotation about an axis parallel to the axis of the rotatable member 42 between a locked position and an unlocked position. An arm 88 is attached to the plug 86 and is rotatable therewith between a position corresponding to the locked position of the plug 86 for engaging the follower 43 when the rotatable member 42 is in the latched position to block movement thereof to the open position as shown in FIG. 4; and a position corresponding to the unlocked position of the plug 86 shown in FIG. 2 for affording movement of the follower 43.

The conventional key-operated, rotatable plug 86 is journaled for rotation within a flanged generally cylindrical lock housing 92 mounted axially parallel to the hub 24 through a flatted orifice in the wall 20 by a jam nut 94 threadably engaging the periphery of the lock housing 92. The plug 86 is positioned to afford engagement of a key (not shown) through a keyway 93 accessible from the exterior surface of the first portion 14. Use of the key affords rotation of the plug 86 approximately 90 degrees between the locked position (FIG. 4) affording engagement of pins within the lock housing 92 with the plug 86 in the conventional manner when the key is removed; and the unlocked position defined by the limited travel of a pin 96 on the lock arm 88 attached to the plug 86 in a groove 99 formed in the lock housing 92. The lock arm 88 is generally L-shaped, being formed of a plate 100 radially extending from the end of the plug 86 and a pin 104 attached to the distal end of the plate 100 in axial alignment with the plug 86. The lock arm 88 is rotatable with the plug 86 when the rotatable member 42 is in its latched position between a blocking position corresponding to the locked position of the plug 86 at which a notch at the end of the pin 104 engages an edge 106 of the follower 43 (FIG. 4) to block movement thereof toward its open position; and a position corresponding to the unlocked position of the plug 86 (FIG. 2) at which the pin 104 is positioned adjacent the wall of the hub 24 to afford movement of the follower 43. The end of the follower 43 adjacent the lock arm 88 in the latched position of the rotatable member 43 is formed with a radiused edge 108 to allow movement of the lock arm 88 between the blocking and the non-blocking position when the rotatable member 42 and follower 43 are in the latched position.

Operation of the mechanism to lock the storage container 10 will now be explained. The first and second portions 14 and 16 are assembled in a mating relationship with the rotatable member 42 moved to the open position at which the catch element 67 engages the groove 80 and the follower 43 is positioned to that it may be projected through the notches 62 into the hub 24. The rotatable member 42 is then rotated by grasping the handle to move the follower 43 into engagement with the ramped surface 44 and draw the first and second portions 14 and 16 into sealed relationship about the O-ring gaskets 34 and 40, which sealed relationship is achieved at the intermediate closed position of the rotatable member 42 at which the catch element 67 engages the groove 82. During this rotation, the inclined edges 84 of the grooves 80 and 82 have moved the catch element 67 between its engaged and its release position upon a predetermined rotational force being applied to the rotatable member 42 without the necessity of manually operating the catch member 64. During subsequent rotation of the rotatable member 42 to the latched position, the sealed relationship between the portions 14 and 16 is maintained by the ramped surface 44, and at the latched position the catch element 67 engages the keeper 78 under the influence of the spring 74 to prevent rotation of the rotatable member 42 toward the open position until the catch member 64 is manually operated to release this engagement. When the rotatable member 42 is in the latched position, the mechanism 12 may be locked by rotating the plug 86 from its open to its locked position via a key, thereby moving the arm 88 from a position adjacent the wall of the hub 24 affording rotation of the rotatable member 42, to a position in engagement with an edge 106 of the follower 43 preventing rotation thereof toward the open position. The key may then be removed to afford a locked storage container 10.

What is claimed is:

1. A mechanism for releasably coupling together a first and a second portion of a reel storage container, the mechanism comprising:

a manually engageable movable member adapted to be mounted on said second portion for movement relative thereto between an open and a latched position, said movable member including a follower;

catch means for manually releasably latching said movable member and said second portion when said movable member is at said latched position;

a member defining a ramped surface adapted to be mounted on said first portion to be out of engagement with said follower when said movable member is in said open position to afford positioning said first and second portions in closed relationship, and to afford engagement of said follower on said ramped surface to draw said portions into sealed engagement when said movable member is moved to said latched position; and lock means for releasably locking the movable member in the latched position comprising:

a key-operated pin tumbler lock mechanism adapted to be mounted on said storage container and having a plug rotatable between a locked position and an unlocked position; and an arm attached to said plug and rotatable therewith when said plug is moved to the locked position and said movable member is in said latched position to engage said follower to block movement thereof toward said open position.

2. The mechanism of claim 1 wherein said catch means comprises a catch member mounted on said movable member for movement between an engaged and a release position, said second portion is adapted to form a keeper positioned for engagement by said catch member upon movement thereof to said engaged position when said movable member is in said latched position, and biasing means for biasing said catch member toward said engaged position, said catch member being adapted for manual movement to said release position thereby affording movement of said movable member from said latched position toward said open position.

3. The mechanism of claim 2 wherein said ramped surface is shaped to draw said portions into sealed engagement upon engagement thereof by said follower at an intermediate position between said open and said latched positions of said movable member, and said second portion is formed with grooves engageable by said catch member under the influence of said biasing means at said open and at said intermediate positions, said grooves having edges formed to move said catch member to said release position when a predetermined force is applied to said movable member toward another of said positions.

4. The mechanism of claim 1 wherein said movable member is mounted for rotation between said open and said latched positions, said follower is a bar-like member extending diametrically of the axis of rotation of said movable member, and said member defining the ramped surface defines a ramped surface for each end of said bar to draw said portions into sealed engagement when said movable member is rotated to said latched position.

5. A lockable reel storage container, comprising:

first and second mating container portions, said portions when mated forming a generally centrally located hub, and having a chamber around said hub adapted to receive a reel;

a mechanism extending through said hub for releasably coupling said container portions comprising:

a manually engageable movable member mounted on said second portion for movement relative thereto between an open and a latched position, said movable member including a follower;

a member defining a ramped surface mounted on said first portion to be out of engagement with said follower when said movable member is in said open position to afford positioning said first and second portions in closed relationship, and to afford engagement of said follower on said ramped surface to draw said portions into sealed engagement when said movable member is moved to said latched position; and lock means for releasably locking the movable member in the latched position comprising:

a key-operated pin tumbler lock mechanism mounted on said storage container and having a plug rotatable between a locked position and an unlocked position; and an arm attached to said plug and rotatable therewith when said plug is moved to the locked position and said movable member is in said latched position to engage said follower to block movement thereof toward said open position.

6. The storage container of claim 5 wherein said mechanism further includes catch means for manually releasably latching said movable member and said second portion when said movable member is at said latched position.

7. The storage container of claim 6 wherein said catch means comprises a catch member mounted on said movable member for movement between an engaged and a release position, a keeper formed on said second portion and positioned for engagement by said catch member upon movement thereof to said engaged position when said movable member is in said latched position, and biasing means for biasing said catch member toward said engaged position, said catch member being adapted for manual movement to said release position thereby affording movement of said movable member from said latched position toward said open position.

8. The storage container of claim 7 wherein said ramped surface is shaped to draw said portions into said sealed engagement upon engagement thereof by said follower at an intermediate position between said open and said latched positions of said movable member, and said second portion has grooves engageable by said catch member under the influence of said biasing means at said open and at said intermediate positions, said grooves having edges formed to move said catch member to said release position when a predetermined force is applied to said movable member toward another of said positions.

9. The storage container of claim 5 wherein said movable member is mounted for rotation between said open and said latched position, said follower is a bar-like member extending diametrically of the axis of rotation of said movable member, and said member defining the ramped surface defines a ramped surface for each end of said bar to draw said portions into sealed engagement when said movable member is rotated to said latched position.

* * * * *

UNITED STATES PATENT OFFICE
CERTIFICATE OF CORRECTION

Patent No. 3,754,421 Dated August 28, 1973

Inventor(s) Wayne M. Wirth

It is certified that error appears in the above-identified patent and that said Letters Patent are hereby corrected as shown below:

Column 1, line 24, change "braodcasting" to -- broadcasting --;

line 39, change "mounted on and being" to -- and being mounted on --; and line 54, change "an" (first occurrence) to -- and --.

Column 2, line 25, change "firt" to -- first --.

Column 3, line 4, change "flanged" to -- flange --.

Column 4, line 1, change "he" to -- the --.

Signed and sealed this 19th day of February 1974.

(SEAL)
Attest:

EDWARD M.FLETCHER,JR.
Attesting Officer

C. MARSHALL DANN
Commissioner of Patents